United States Patent
Lahr et al.

(10) Patent No.: US 10,295,000 B2
(45) Date of Patent: May 21, 2019

(54) MECHANICAL DIODE

(71) Applicant: GM GLOBAL TECHNOLOGY OPERATIONS LLC, Detroit, MI (US)

(72) Inventors: Derek F. Lahr, Howell, MI (US); Farzad Samie, Franklin, MI (US); Dongxu Li, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 467 days.

(21) Appl. No.: 15/211,646

(22) Filed: Jul. 15, 2016

(65) Prior Publication Data
US 2018/0017121 A1    Jan. 18, 2018

(51) Int. Cl.
| | | |
|---|---|---|
| *F16D 27/10* | (2006.01) | |
| *F16D 41/12* | (2006.01) | |
| *F16D 41/14* | (2006.01) | |
| *F16D 67/06* | (2006.01) | |
| *H02K 49/04* | (2006.01) | |

(52) U.S. Cl.
CPC ........... *F16D 41/125* (2013.01); *F16D 27/10* (2013.01); *F16D 41/14* (2013.01); *F16D 67/06* (2013.01); *H02K 49/04* (2013.01)

(58) Field of Classification Search
CPC ........ F16D 41/125; F16D 41/14; F16D 27/10; F16D 27/108; F16D 27/118; F16D 67/06; H02K 49/04; H02K 49/043; H02K 49/046
See application file for complete search history.

(56) References Cited

U.S. PATENT DOCUMENTS

| | | | | |
|---|---|---|---|---|
| 4,966,265 A | * | 10/1990 | Wiese | B60K 17/351 180/248 |
| 5,007,498 A | * | 4/1991 | Wiese | B60K 17/351 180/248 |
| 8,196,724 B2 | * | 6/2012 | Samie | B60K 6/383 192/43.1 |
| 2004/0020737 A1 | * | 2/2004 | Webber | F16D 13/12 192/35 |

* cited by examiner

*Primary Examiner* — Richard M Lorence
(74) *Attorney, Agent, or Firm* — Quinn IP Law

(57) ABSTRACT

A mechanical diode to transfer torque between a first torque member and a second torque member is described, and includes a first race element, a second race element and a slide plate that are coaxially disposed in the housing. The slide plate includes a tab element projecting radially outwardly. The slide plate is rotatable to one of a first position and a second position. A spring element is disposed between the slide plate and one of the first and second race elements, and is configured to urge the slide plate to the first position. A controllable braking element is disposed to apply a braking force to the tab element of the slide plate to urge the slide plate to achieve the second position in response to a control signal.

19 Claims, 4 Drawing Sheets

MECHANICAL DIODE

TECHNICAL FIELD

The present disclosure relates to mechanical diodes, and activation thereof.

BACKGROUND

Mechanical diodes, e.g., selectable one-way clutches (SOWCs) are frictionless engagement clutches that selectively produce a mechanical connection between a driving member and a driven member, and may be advantageously applied in a powertrain system to effect torque transfer between rotating elements, e.g., within a gearbox of a transmission. Known mechanical diodes preferably include a first coupling plate coupled to a driving member and a second coupling plate attached to a driven member, and a selector plate. The first and second coupling plates may be locked together, i.e., engaged to transfer torque in one or both rotational directions, and may also be capable of overrunning in one or both rotational directions under certain operating states, depending on its particular design.

The mechanical devices that are used to lock the first and second coupling plates may include rollers, sprags, rockers, struts, or other suitable torque-transmitting elements, a plurality of which are positioned in races formed in the first and second coupling plates. Depending on the particular type or style of mechanical diode and the required direction of rotation and torque holding, each race may contain unique surface features, such as pockets, windows or strut wells that are suitable for engaging one or more of the torque-transmitting elements positioned therein in order to selectively enable various clutch operating modes.

SUMMARY

A mechanical diode disposed in a housing to transfer torque between a first torque member and a second torque member is described and includes a first race element, a second race element and a slide plate that are coaxially disposed in the housing. The first race element is coupled to the first torque member and the second race element is coupled to the second torque member. The slide plate includes a tab element that projects radially outwardly, and the slide plate is rotatable to one of a first position and a second position. A spring element is disposed between the slide plate and one of the first and second race elements, and is configured to urge the slide plate to the first position. A controllable braking element is attached to the housing, is annular to the second race element, and includes a slot portion disposed to accommodate the tab element of the slide plate. The controllable braking element is disposed to apply a braking force to the tab element of the slide plate to urge the slide plate to achieve the second position in response to a control signal.

The above features and advantages, and other features and advantages of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Like numerals refer to like elements throughout the various drawings.

Figure 1:
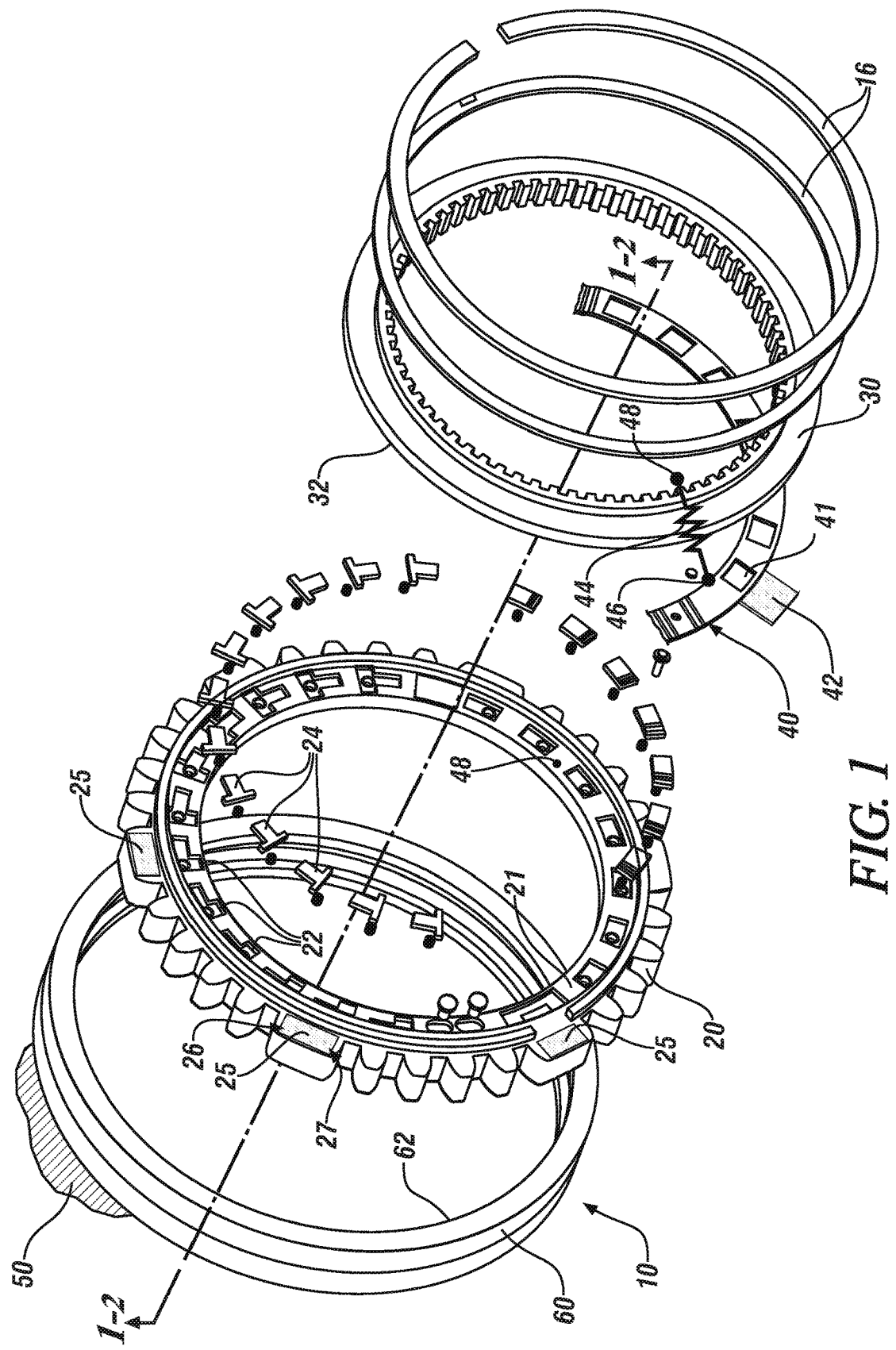
FIG. 1 schematically illustrates an exploded view of a first embodiment of a mechanical diode, in accordance with the disclosure.
Figure 2:
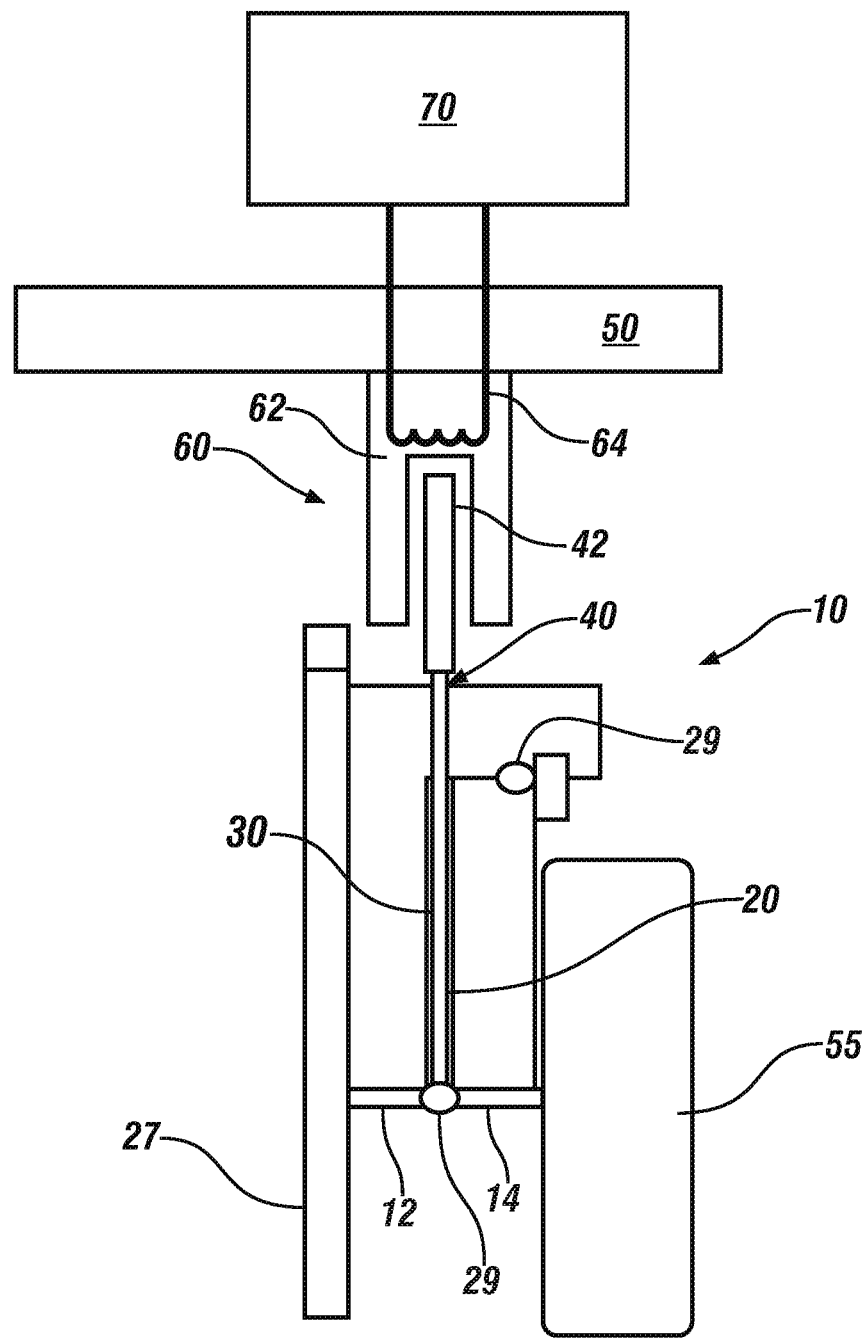
FIG. 2 schematically illustrates a cut-away side-view of the first embodiment of a portion of the mechanical diode described with reference to FIG. 1 that is disposed within a housing, in accordance with the disclosure.

Referring now to FIGS. 1 and 2, a first embodiment is shown of a mechanical diode in the form of a selectable one-way clutch (SOWC) 10 that is advantageously disposed in a housing 50 to selectively transfer torque between a first torque member 12 and a second torque member 14. In one embodiment, the first torque member 12 is coupled to a crankshaft of an internal combustion engine and the second torque member 14 is coupled to a pump portion (not shown) of a torque converter 55, and the torque converter 55 is coupled to an input member of an automatic transmission. In one embodiment, the first and second torque members 12, 14 include a crankshaft/flywheel of an internal combustion engine and an input member of a manual transmission gearbox, respectively, without an intervening torque converter. In such embodiments, a second, user-activated clutch may be disposed between the input member and the manual transmission gearbox. The SOWC 10 is disposed to connect the first and second torque members 12, 14 under certain conditions to transfer torque therebetween, and also disconnect the first and second torque members 12, 14 under certain other conditions.

The SOWC 10 preferably includes a first race element 20, a second race element 30 and a slide plate 40 that are circumscribed by an annular controllable braking device 60 and disposed within the housing 50 in one embodiment. The first race element 20 is coupled to the first torque member 12 and the second race element 30 is coupled to the second torque member 14. In one embodiment, the slide plate 40 is interposed between the first and second race elements 20, 30. Alternatively, the slide plate 40 may be in any suitable location. The first race element 20, second race element 30 and slide plate 40 are annular devices that are assembled and secured into place by one or a plurality of retainer rings 16, and secured via suitable bearing surfaces 29, seals, and other devices. Preferably, the braking device 60 is fixedly secured to an inner annular portion of the housing 50, and the SOWC 10 is rotatably arranged to permit one or a plurality of tabs 42 of the slide plate 40 to travel in a brake slot 62 that is formed in and circumscribes an inner periphery of the braking device 60.

The first race element 20, also referred to as a strut plate or a pocket plate, is an annular device that preferably has a pocket-shaped cross-section including a first side 21 having a race area that includes a plurality of spring-actuated retractable struts 24 disposed in strut pockets 22 that are located circumferentially within the pocket area of the first side 21. The first race element 20 preferably includes a plurality of tab slots 25 that pass from an inner radial surface to an outer radial surface thereof. Each of the tab slots 25 are designed to accommodate a tab 42 of the slide plate 40, and are preferably located on the first side 21 of the first race element 20 to facilitate assembly of the tabs 42 and the slide plate 40. Each of the tab slots 25 preferably has a circumferential length that limits rotation of the corresponding tab 42 between a first position 26 and a second position 27. The circumferential length of each of the tab slots 25 in the first race element 20 is selected to accommodate rotation of the slide plate 40 to each of the first position 26 and the second position 27 by circumscribing the movement of the corresponding tab 42 therein.

The second race element 30, also referred to as a notch plate, is an annular device that preferably has a plurality of notches 32 that are located circumferentially, and correspond to the plurality of spring-actuated retractable struts 24 disposed in strut pockets 22 of the first race element 20 when the first and second race elements 20, 30 are aligned.

The slide plate 40 is an annular plate device having a plurality of pass-through voids 41 and one or a plurality of tabs 42 that project radially outwardly. In one embodiment, the tabs 42 are fabricated from an electrically conductive material, e.g., ferro-magnetic materials. The pass-through voids 41 are disposed to align with the retractable struts 24 disposed in the strut pockets 22 of the first race element 20 and align with the corresponding plurality of notches 32 of the second race element 30. The slide plate 40 is configured to slidably move within the annular race of the first race element 20 and rotate about a common axis. When the slide plate 40 is rotated to the first position 26 as limited by the rotation of the tabs 42 in a first direction within the tab slots 25, the retractable struts 24 project through the pass-through voids 41 to interact with and engage the notches 32 of the second race element 30, in either a first direction of rotation for torque transfer, or in both rotational directions for torque transfer, depending upon the particular design. When the slide plate 40 is rotated to the second position 27 as limited by the rotation of the tabs 42 in a second, opposite direction within the tab slots 25, the retractable struts 24 are restrained into the strut pockets 22, permitting the first and second race elements 20, 30 to freewheel in one direction of rotation, or alternatively, in both directions of rotation. Other details related to design features of the SOWC 10 are known to those skilled in the art.

A spring 44 or another suitable tensioning device is disposed therein, and includes a first end 46 that is preferably coupled to the first race element 20 and a second end 48 that is coupled to the slide plate 40 in one embodiment. The spring 44 is oriented in a tension state to urge the slide plate 40 to the first position, thus allowing the retractable struts 24 to project through the pass-through voids 41 to interact with and engage the notches 32 of the second race element 30 to transfer torque in one embodiment. Thus, the default state of the SOWC 10 is the activated or engaged state in one embodiment. Alternatively, the spring 44 may be oriented in a tension state to urge the slide plate 40 to the second position, thus retracting the retractable struts 24 to prevent interaction with the notches 32 of the second race element 30, thus permitting freewheeling of the first and second race elements 20, 30, with the default state of the SOWC 10 being the deactivated or disengaged state. The activated state of the SOWC 10 is associated with torque transfer between the first and second race elements 20, 30 in one or both directions, and the deactivated state of the SOWC 10 is associated with freewheeling between the first and second race elements 20, 30.

The housing 50 is annular to the SOWC 10, and is disposed to secure the SOWC 10 in the transmission gearbox or another suitable device, and permits its rotation therein. The housing 50 includes the inner annular portion that includes the controllable braking device 60. In one embodiment, the braking device 60 is an eddy current brake 60 that includes a brake slot 62 that has a plurality of inductive coils 64 incorporated therein. The brake slot 62 is disposed to accommodate the tabs 42 of the slide plate 40.

The eddy current brake 60 is electrically connected to a controller 70, and the controller 70 includes suitable control circuitry to transfer electric current to the inductive coils 64 in response to a brake activation signal. The plurality of inductive coils 64 generate a magnetic field in the brake slot 62, which acts upon the tabs 42 of the slide plate 40 to impede its movement.

When the SOWC 10 is rotating, activation of the eddy current brake 60 impedes rotation of the tabs 42 of the slide plate 40. So long as the torque exerted through the SOWC 10 is greater than the magnitude of the braking force exerted by the eddy current brake 60, the SOWC 10 including the tabs 42 of the slide plate 40 rotates. The braking force impedes the movement of the tabs 42 in relation to the rotation of the other elements of the SOWC 10. The impeded rotation of the tabs 42 and slide plate 40 can overcome the force of the spring 44 and urge the slide plate 40 to rotate to the second position, which deactivates the SOWC 10 by retracting the struts 24 of the SOWC 10. This permits freewheeling rotation of the first torque member 12 in relation to the rotation of the second torque member 14 in one direction of rotation, or alternatively, in both directions of rotation. In an alternative embodiment, the braking device is a friction brake that includes disc brake elements that exert a normal force upon the tabs 42 of the slide plate 40.

The mechanical diode 10 described herein preferably has two states, referred to as engaged and disengaged states. A spring preload is used to hold the mechanical diode 10 in one of these two states as a default state. When the mechanical diode 10 rotates in conjunction with rotation of one or both the first torque member 12 and the second torque member 14, the controller 70 can activate the inductive coils 64 of the eddy current brake 60 to apply drag to the tabs 42 of the slide plate 40, thus causing it to rotate against the spring preload of the spring 44 and change the state of the mechanical diode 10. When the mechanical diode 10 is an engine disconnect clutch, the torque may be applied in the direction of engine braking torque, facilitating connection and disconnection of an internal combustion engine from a transmission input member as part of transferring engine braking torque. A second one-way clutch may be disposed in the engine driving direction.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. A controller executes control routine(s) to provide desired functions, including monitoring inputs from sensing devices and other networked controllers and executing control and diagnostic routines to control operation of actuators. Routines may be periodically executed at regular intervals, or may be executed in response to occurrence of a triggering event, such as an activation command. Communication between controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

Figure 3:
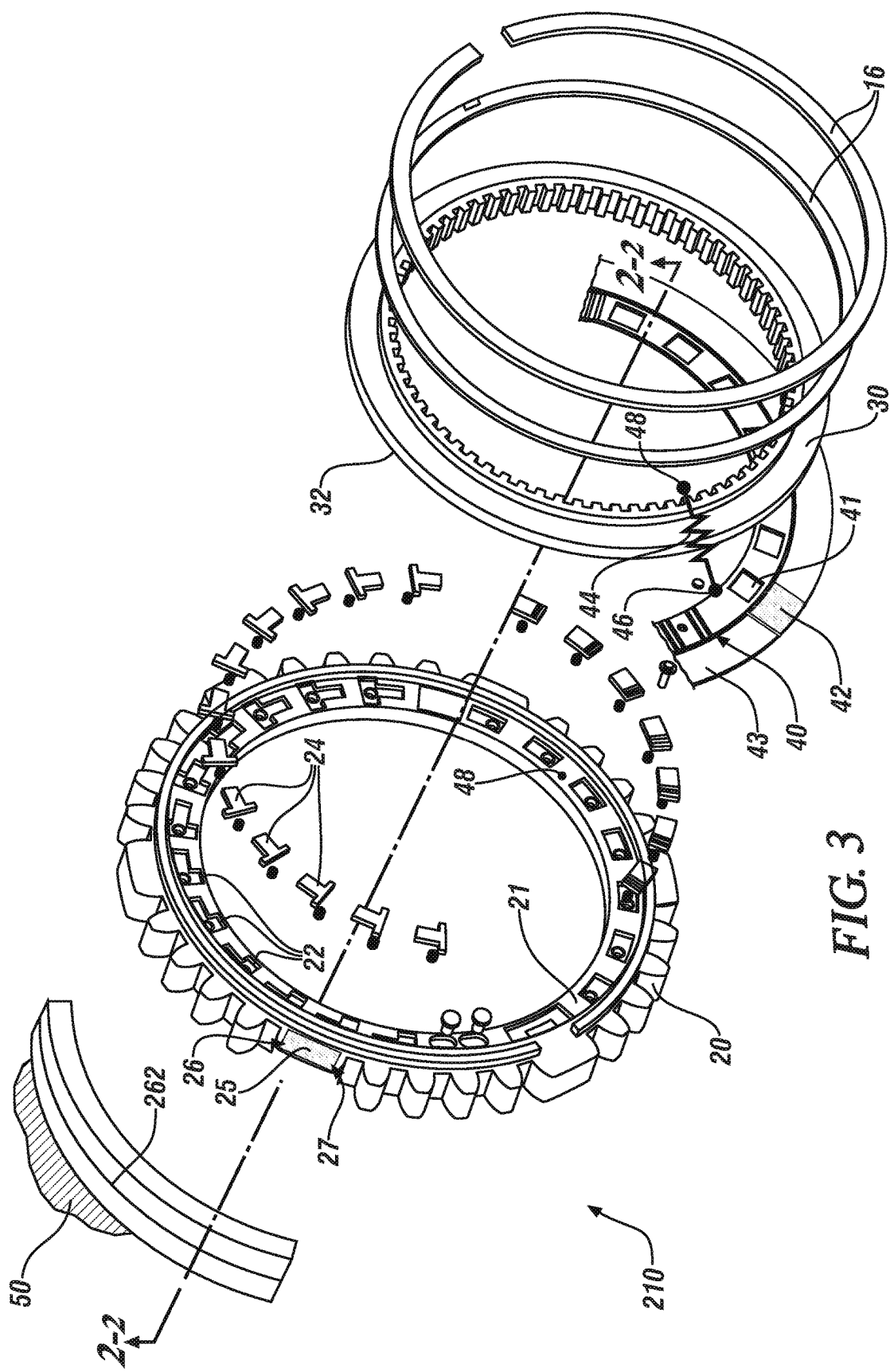
FIG. 3 schematically illustrates an exploded view of a second embodiment of a mechanical diode, in accordance with the disclosure.
Figure 4:
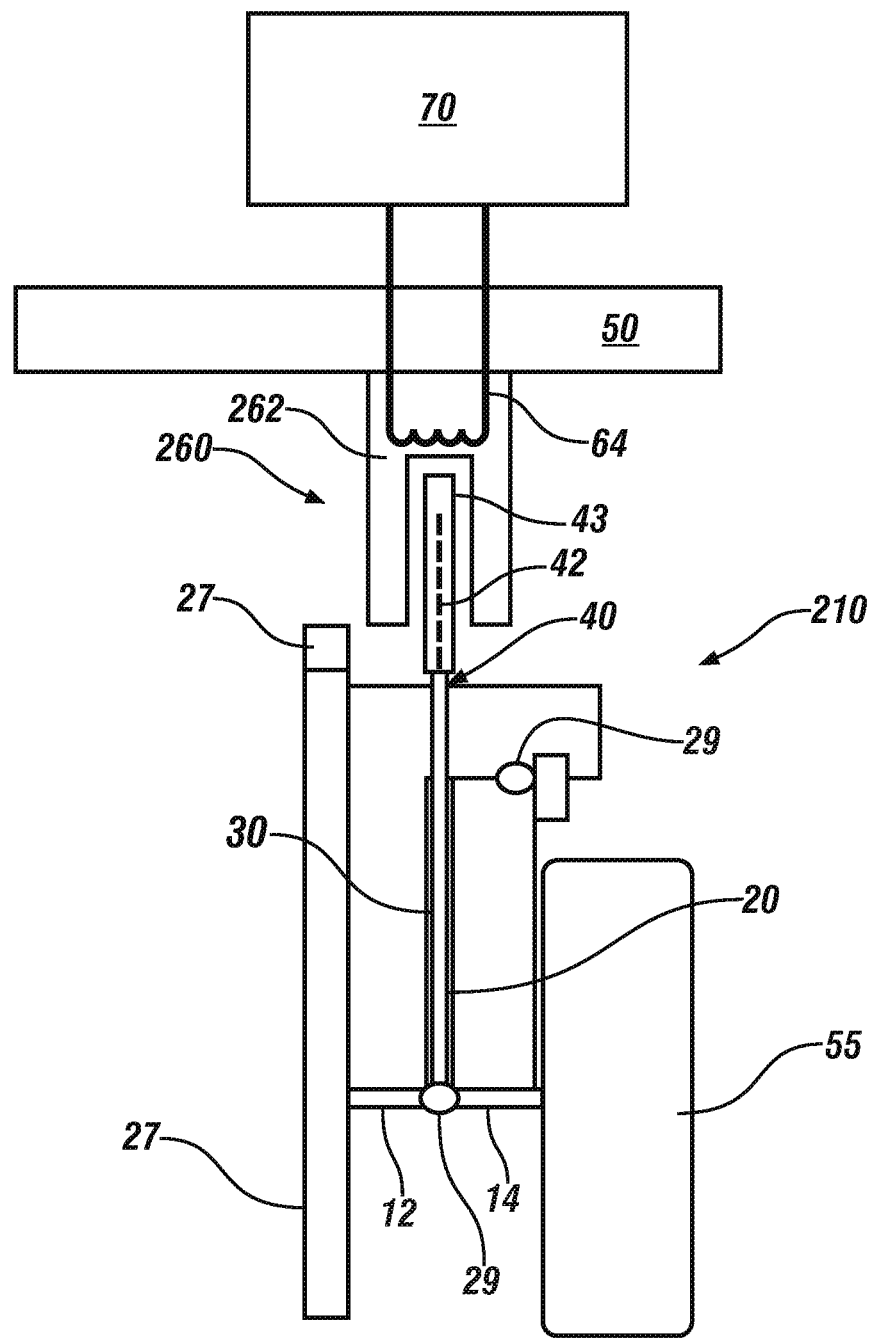
FIG. 4 schematically illustrates a cut-away side-view of the second embodiment of a portion of the mechanical diode described with reference to FIG. 3 that is disposed within a housing, in accordance with the disclosure.

Referring now to FIGS. 3 and 4, another embodiment is shown of a mechanical diode in the form of a selectable one-way clutch (SOWC) 210 that is advantageously disposed in the housing 50 to selectively transfer torque between the first torque member 12 and the second torque member 14. In one embodiment, the first and second torque members 12, 14 include a crankshaft/flywheel of an internal combustion engine and a pump of a torque converter 55, respectively, wherein the torque converter 55 is coupled to an input member of an automatic transmission. In one embodiment, the first and second torque members 12, 14 include a crankshaft/flywheel of an internal combustion engine and an input member of a manual transmission, respectively, without an intervening torque converter. In such embodiments, a second, user-activated clutch may be disposed between the input member and the manual transmission. The SOWC 210 is disposed to connect the first and second torque members 12, 14 under certain conditions to transfer torque therebetween.

The SOWC 210 is analogous to the SOWC 10 that has been previously described, and preferably includes the first race element 20, the second race element 30, the slide plate 40, and an annular ring 43. The annular ring 43 circumscribes the slide plate 40. A controllable braking device 260 is disposed within the housing 50 in one embodiment. The first race element 20 is coupled to the first torque member 12 and the second race element 30 is coupled to the second torque member 14. The slide plate 40 may be interposed between the first and second race elements 20, 30 in one embodiment. The first race element 20, second race element 30 and slide plate 40 are annular devices that are assembled and secured into place by one or a plurality of retainer rings 16, and secured via suitable bearing surfaces 29, seals and other devices.

The slide plate 40 is an annular plate device having a single tab 42 that projects radially outwardly. The annular ring 43 is coaxial with and circumscribes the slide plate 40. The tab 42 is fixedly attached to the annular ring 43, which is fabricated from an electrically conductive material, e.g., a ferro-magnetic material.

The controllable braking device 260 is preferably disposed along a portion of the outer periphery of the SOWC 210, and includes a brake slot 262 that is designed to accommodate the annular ring 43, which rotates therein. In one embodiment, the braking device 260 is an eddy current brake that preferably includes a single inductive coil 64. The eddy current brake 260 is electrically connected to a controller 70, and the controller 70 includes suitable control circuitry to transfer electric current to the inductive coil 64 in response to a brake activation signal. The inductive coil 64 generates a magnetic field in the brake slot 262, which acts upon the annular ring 43, which acts upon the tab 42 of the slide plate 40 to impede its movement.

When the SOWC 210 is rotating, activation of the eddy current brake 260 impedes rotation of the annular ring 43 and the tab 42 of the slide plate 40. So long as the torque exerted through the SOWC 210 is greater than the magnitude of the braking force exerted by the eddy current brake 260, the SOWC 210 including the annular ring 43 and the tab 42 of the slide plate 40 rotates. The braking force impedes the movement of the annular ring 43 and the tab 42 in relation to the rotation of the other elements of the SOWC 210. The impeded rotation of the annular ring 43, the tab 42 and slide plate 40 can overcome the force of the spring 44 and urge the slide plate 40 to rotate to the second position, which deactivates the SOWC 210 by retracting the struts 24 of the SOWC 210. This permits freewheeling rotation of the first torque member 12 in relation to the rotation of the second torque member 14 in one direction of rotation, or alternatively, in both directions of rotation. In an alternative embodiment, the braking device is a friction brake that includes disc brake elements that exert a normal force upon the tab 42 of the slide plate 40.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A mechanical diode disposed in a housing to transfer torque between a first torque member and a second torque member, comprising:

a first race element, a second race element and a slide plate coaxially disposed in the housing, wherein the first race element is coupled to the first torque member and the second race element is coupled to the second torque member, wherein the slide plate includes a tab element projecting radially outwardly, and wherein the slide plate is rotatable to one of a first position and a second position;

a spring element disposed between the slide plate and one of the first and second race elements, wherein the spring element is configured to urge the slide plate to the first position; and a controllable braking element attached to the housing and annular to the second race element, wherein the controllable braking element includes a slot portion disposed to accommodate the tab element of the slide plate;

wherein the controllable braking element is disposed to apply a braking force to the tab element of the slide plate to urge the slide plate to achieve the second position in response to a control signal.

2. The mechanical diode of claim 1, further comprising the tab fixedly attached to an annular ring, wherein the slot portion is disposed to accommodate the annular ring, and wherein the controllable braking element is disposed to apply the braking force to the annular ring to urge the slide plate to achieve the second position in response to the control signal.

3. The mechanical diode of claim 2, wherein the annular ring is fabricated from an electrically conductive material, and wherein the controllable braking element comprises an electro-magnetic device that is disposed as an eddy current brake.

4. The mechanical diode of claim 1, wherein the tab of the slide plate is fabricated from an electrically conductive material, and wherein the controllable braking element comprises an electro-magnetic device.

5. The mechanical diode of claim 1, wherein the controllable braking element comprises an eddy current brake.

6. The mechanical diode of claim 1, wherein the first position is associated with clutch activation to effect torque transfer between the first and second torque members in a first rotational direction, and wherein the second position is associated with clutch deactivation to effect freewheeling between the first and second torque members in a first rotational direction.

7. The mechanical diode of claim 1, wherein the first position is associated with clutch deactivation to effect freewheeling between the first and second torque members in a first rotational direction, and wherein the second position is associated with clutch activation to effect torque transfer between the first and second torque members.

8. The mechanical diode of claim 1, wherein the slot portion of the controllable braking element comprises an annular slot disposed on an inside portion of the controllable braking element.

9. The mechanical diode of claim 1, wherein the controllable braking element is disposed to apply the braking force to the tab element of the slide plate sufficient to urge the slide plate to overcome the spring force exerted by the spring element to achieve the second position in response to the control signal during rotation of the first torque member in a first rotational direction.

10. The mechanical diode of claim 1, wherein the first race element, the second race element and the slide plate are rotatably disposed in the housing.

11. A method for controlling a mechanical diode, wherein the mechanical diode is rotatably disposed in a housing and includes a first race element, a second race element and a slide plate, wherein the first race element is coupled to a first torque member and the second race element is coupled to a second torque member, wherein the slide plate includes a tab element projecting radially outwardly, and wherein a spring element is disposed to urge the slide plate to a first position associated with one of an activated state and a deactivated state of the mechanical diode, the method comprising:

applying, via a controllable braking element, a braking force to the tab element of the slide plate to urge the slide plate to a second position associated with the other of the activated state and the deactivated state when the mechanical diode is rotating.

12. The method of claim 11, comprising applying an electro-magnetic force to the tab element of the slide plate to urge the slide plate to the second position when the mechanical diode is rotating.

13. A mechanical diode arranged to transfer torque between a first torque member and a second torque member, wherein the first torque member is coupled to a crankshaft of an internal combustion engine and the second torque member is coupled to a pump portion of a torque converter, the mechanical diode comprising:

a first race element, a second race element and a slide plate, wherein the slide plate is interposed between the first and second race elements, wherein the first race element includes a radially-disposed tab slot, and wherein the first race element is coupled to the first torque member and the second race element is coupled to the second torque member;

the slide plate including a radially-projecting tab, wherein the tab is disposed in the tab slot, wherein the slide plate is movable to one of a first position and a second position and wherein the first and second positions are associated with a location of the tab in the tab slot;

a spring element disposed between the slide plate and one of the first and second race elements, wherein the spring element is configured to urge the tab to the first position; and a controllable braking element attached to the housing and annular to the second race element, wherein the controllable braking element includes a slot portion disposed to accommodate the tab of the slide plate.

14. The mechanical diode of claim 13, further comprising the tab fixedly attached to an annular ring, wherein the slot portion is disposed to accommodate the annular ring, and wherein the controllable braking element is disposed to apply the braking force to the annular ring to urge the slide plate to achieve the second position in response to the control signal.

15. The mechanical diode of claim 14, wherein the annular ring is fabricated from an electrically conductive material, and wherein the controllable braking element comprises an electro-magnetic device that is disposed as an eddy current brake.

16. The mechanical diode of claim 13, wherein the tab of the slide plate is fabricated from an electrically conductive material, and wherein the controllable braking element comprises an electro-magnetic device.

17. The mechanical diode of claim 13, wherein the controllable braking element comprises an eddy current brake.

18. The mechanical diode of claim 13, wherein the first position is associated with clutch activation to effect torque transfer between the first and second torque members in a first rotational direction, and wherein the second position is associated with clutch deactivation to effect freewheeling between the first and second torque members in the first rotational direction.

19. The mechanical diode of claim 13, wherein the first position is associated with clutch deactivation to effect freewheeling between the first and second torque members in a first rotational direction, and wherein the second position is associated with clutch activation to effect torque transfer between the first and second torque members in the first rotational direction.

* * * * *